(12) United States Patent
Van Alsenoy

(10) Patent No.: US 10,266,259 B1
(45) Date of Patent: Apr. 23, 2019

(54) SYSTEMS AND METHODS FOR RECOVERY OF TETHERED AIRBORNE VEHICLE

(71) Applicant: Makani Technologies LLC, Alameda, CA (US)

(72) Inventor: Thomas Van Alsenoy, San Francisco, CA (US)

(73) Assignee: Makani Technologies LLC, Alameda, CA (US)

( * ) Notice: Subject to any disclaimer, the term of this patent is extended or adjusted under 35 U.S.C. 154(b) by 276 days.

(21) Appl. No.: 15/384,436

(22) Filed: Dec. 20, 2016

(51) Int. Cl.
*B64C 39/02* (2006.01)
*H02K 7/18* (2006.01)
*B64F 3/00* (2006.01)
*F03D 9/16* (2016.01)
*B66D 1/50* (2006.01)

(52) U.S. Cl.
CPC ............. *B64C 39/022* (2013.01); *B64F 3/00* (2013.01); *B66D 1/50* (2013.01); *F03D 9/16* (2016.05); *H02K 7/183* (2013.01); *B64C 2201/12* (2013.01)

(58) Field of Classification Search
CPC . B64C 39/022; B64C 31/06; B64C 2201/148; B64F 3/00; B64F 3/02; B66D 1/50; B66D 1/52; F03D 9/16
USPC ........................................................ 254/4 R
See application file for complete search history.

(56) References Cited

U.S. PATENT DOCUMENTS

| | | | | |
|---|---|---|---|---|
| 4,058,277 A * | 11/1977 | Kozakiewicz | ............ | B64F 3/00 244/17.13 |
| 4,895,079 A * | 1/1990 | Beatty | ....................... | B66D 1/50 104/174 |
| 4,981,456 A * | 1/1991 | Sato | ........................ | A63H 27/04 244/17.13 |
| 9,013,055 B1 * | 4/2015 | Phipps | ...................... | F03D 5/06 244/153 R |
| 2002/0040948 A1 * | 4/2002 | Ragner | ................ | A63H 27/002 244/153 R |
| 2010/0295303 A1 * | 11/2010 | Lind | ..................... | B64C 39/022 290/44 |
| 2010/0308174 A1 * | 12/2010 | Calverley | ............... | B64C 27/02 244/155 A |
| 2011/0210559 A1 * | 9/2011 | Zanetti | ..................... | F03D 5/06 290/55 |
| 2012/0049533 A1 * | 3/2012 | Kelly | ....................... | F03D 5/04 290/55 |
| 2013/0307274 A1 * | 11/2013 | Sia | ........................... | F03D 5/00 290/55 |

(Continued)

FOREIGN PATENT DOCUMENTS

| | | | | |
|---|---|---|---|---|
| GB | 1092792 A | * | 11/1967 | ................ B66D 1/50 |
| WO | WO-2015173492 A1 | * | 11/2015 | ................ B64F 1/14 |

*Primary Examiner* — Magdalena Topolski
(74) *Attorney, Agent, or Firm* — McDonnell Boehnen Hulbert & Berghoff LLP

(57) ABSTRACT

Systems, methods, and apparatuses for increasing the mechanical energy of an aerial vehicle as part of an Airborne Wind Turbine are disclosed. The aerial vehicle is coupled to a distal portion of a tether and a ground station is coupled to a proximal portion of the tether. A mass possessing a gravitational potential energy is also coupled to the proximal portion of the tether. A connector is configured to releasably hold the mass at an elevation. Release of the mass transfers energy to the aerial vehicle by increasing tension in the tether.

18 Claims, 7 Drawing Sheets

(56) References Cited

U.S. PATENT DOCUMENTS

| | | | |
|---|---|---|---|
| 2014/0361122 A1* | 12/2014 | Ruiterkamp | F03D 5/00 244/154 |
| 2015/0042100 A1* | 2/2015 | Saavedra | F03D 5/06 290/55 |
| 2015/0097086 A1* | 4/2015 | Schaefer | B64C 39/022 244/175 |
| 2015/0130191 A1* | 5/2015 | Houvener | F03B 11/00 290/1 A |
| 2015/0308410 A1* | 10/2015 | Goldstein | F03D 5/06 290/55 |
| 2016/0200551 A1* | 7/2016 | Izz | B66B 9/02 187/250 |
| 2018/0050764 A1* | 2/2018 | Moffat | F03D 9/25 |
| 2018/0155152 A1* | 6/2018 | Belani | B66D 1/36 |
| 2018/0156199 A1* | 6/2018 | Nelson | F03D 9/25 |
| 2018/0292843 A1* | 10/2018 | Nordstrom | G05D 1/0875 |
| 2019/0002102 A1* | 1/2019 | Hundemer | B64F 3/00 |

\* cited by examiner

SYSTEMS AND METHODS FOR RECOVERY OF TETHERED AIRBORNE VEHICLE

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

The use of wind turbines as a means for harnessing energy has been used for a number of years. Conventional wind turbines typically include large turbine blades positioned atop a tower. The cost of manufacturing, erecting, maintaining, and servicing such wind turbine towers, and wind turbines is significant.

An alternative to the costly wind turbine towers that may be used to harness wind energy is to use an aerial vehicle attached to a ground station with an electrically conductive tether. Such an alternative may be referred to as an Airborne Wind Turbine or AWT.

SUMMARY

An airborne wind turbine (AWT) system provides a viable way to harness wind energy in applications that were previously unavailable. As AWT systems become more prevalent, additional systems to safely maintain, recover, and reuse components of AWT systems may also be advanced. Because an AWT includes powered components, there is a chance that one or more components of the AWT could lose power. For example, an aerial vehicle of the AWT could lose power while in flight. In order to reduce the risk of harm from an aerial vehicle crashing due to power loss, a mechanical emergency recovery system is disclosed herein. In particular, example embodiments responsively increase the mechanical energy when a tethered aerial vehicle loses power, such that the aerial vehicle can perform a preventative maneuver to reduce, and perhaps prevent, harm that could potentially result from power loss of the aerial vehicle.

In one aspect, a system includes an aerial vehicle, a ground station and a tether. The aerial vehicle is coupled to a distal portion of the tether, while the ground station is coupled to a proximal portion of the tether. While the aerial vehicle is in flight, the tether is under tension. Furthermore, the system includes a mass possessing a gravitational potential energy that is also coupled to the proximal portion of the tether. Additionally, the system includes a connector that is configured to releasably hold the mass at an elevation. Release of the mass transfers energy to the aerial vehicle by increasing the tension in the tether.

In another aspect, a method includes coupling a mass possessing a gravitational potential energy to a proximal portion of a tether. Additionally, an aerial vehicle is coupled to a distal portion of the tether. The method further includes holding the mass at an elevation by a connector that is configured to releasably hold the mass. Additionally, the method includes releasing the mass held by the connector at the elevation, thus causing the mass to drop. The method also includes increasing a tension in the tether by the mass when the mass drops. The method further includes transferring a mechanical energy from the mass to the aerial vehicle.

In yet another aspect, an apparatus includes a mass that has a gravitational potential energy. The mass is coupled to a proximal portion of a tether. Furthermore, an aerial vehicle is coupled to a distal portion of the tether. The apparatus also includes a connector that is releasably coupled to the mass. The connector is configured to hold the mass at an elevation until the mass is released by the connector. Release of the mass by the connector causes a tension in the tether to increase and energy to be transferred to the aerial vehicle.

These as well as other aspects, advantages, and alternatives, will become apparent to those of ordinary skill in the art by reading the following detailed description, with reference where appropriate to the accompanying drawings.

DETAILED DESCRIPTION

Figure 1:
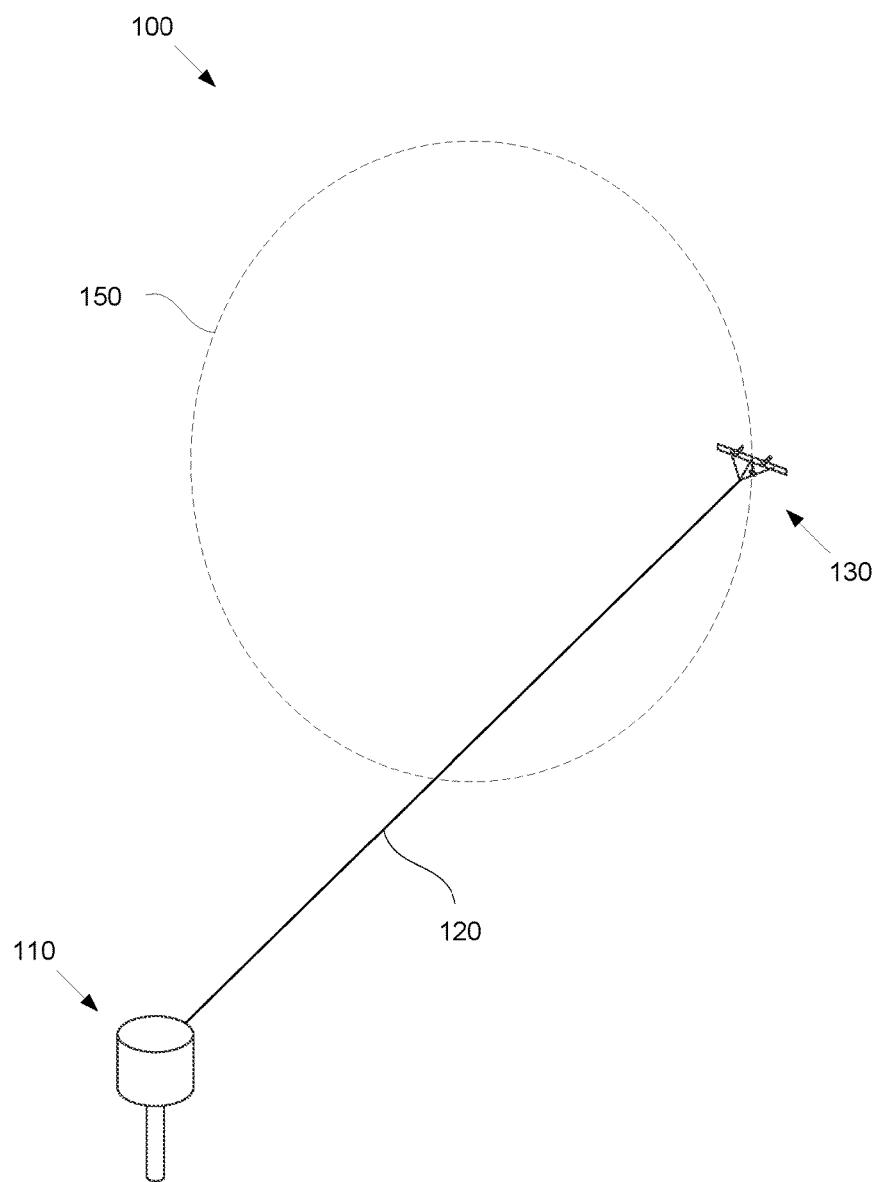
FIG. 1 depicts an Airborne Wind Turbine (AWT) system, according to an example embodiment.

Example apparatuses, methods, and systems are described herein. Any embodiment or feature described herein as an example or as exemplary or illustrative, should not necessarily be construed as preferred or advantageous over other embodiments or features. Furthermore, the example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. OVERVIEW

Illustrative embodiments relate to aerial vehicles, which may be used in a wind energy system, such as an Airborne Wind Turbine (AWT) system. In particular, illustrative embodiments may relate to or take the form of apparatuses, systems, and methods relating to transferring mechanical energy from a mass possessing gravitational potential energy to an aerial vehicle of the AWT. More specifically, illustrative embodiments may relate to increasing a mechanical energy of an aerial vehicle that has lost power or is experiencing another failure by transferring energy from a mass at or near a ground station to the aerial vehicle. In some aspects, the mass may be part of an emergency recovery system of the AWT. The emergency recovery system of the AWT stores mechanical energy by holding the mass at an elevation.

Within examples described herein, illustrative embodiments may relate to or take the form of apparatuses, systems, and methods relating to applying a force to an aerial vehicle of an AWT by increasing a tension in a tether coupled to the aerial vehicle. Applying the force to the aerial vehicle increases an airspeed and/or an altitude of the aerial vehicle. The tension of the tether may be increased by releasing a mass from an elevation. The mass is also coupled to the tether such that, upon release of the mass, the mass applies a force on the tether. In some examples, the mass may be part of an emergency recovery system of the AWT.

By way of background, an AWT may include an aerial vehicle that flies in a closed path, such as a substantially circular path, to convert kinetic wind energy to electrical energy. In an illustrative implementation, the aerial vehicle may be connected to a ground station via a tether. While tethered, the aerial vehicle can: (i) fly at a range of elevations and substantially along the path, and return to the ground, and (ii) transmit electrical energy to the ground station via the tether. In some implementations, the ground station may transmit electricity to the aerial vehicle for take-off and/or landing. The ground station may be located on land or offshore. In some embodiments, the ground station may be fixedly installed, while in other embodiments the ground station may be easily transportable.

In an AWT, an aerial vehicle may rest in and/or on a ground station (or perch) when the wind is not conducive to power generation. When the wind is conducive to power generation, such as when a wind speed may be 3.5 meters per second (m/s) at an altitude of 200 meters, the ground station may deploy (or launch) the aerial vehicle. In addition, when the aerial vehicle is deployed and the wind is not conducive to power generation, the aerial vehicle may return to the ground station.

Moreover, in an AWT, an aerial vehicle may be configured for hover flight and crosswind flight. Crosswind flight may be used to travel in a motion, such as a substantially circular motion, and thus may be the primary technique that is used to generate electrical energy. Hover flight in turn may be used by the aerial vehicle to prepare and position itself for crosswind flight. In particular, the aerial vehicle could ascend to a location for crosswind flight based at least in part on hover flight. Further, the aerial vehicle could take-off and/or land via hover flight.

In hover flight, a span of a main wing of the aerial vehicle may be oriented substantially parallel to the ground, and one or more propellers of the aerial vehicle may cause the aerial vehicle to hover over the ground. In some implementations, the aerial vehicle may vertically ascend or descend in hover flight. Moreover, in crosswind flight, the aerial vehicle may be oriented, such that the aerial vehicle may be propelled by the wind substantially along a closed path, which as noted above, may convert kinetic wind energy to electrical energy. In some implementations, one or more rotors of the aerial vehicle may generate electrical energy by slowing down the incident wind.

An illustrative AWT system may include an amount of mechanical energy. Generally, mechanical energy takes the form of kinetic energy and potential energy. Within examples, in a simplified system (i.e., ignoring friction and other losses), the total mechanical energy of the AWT system is conserved. As such, systems may be designed in order to transfer energy between components of the AWT system. For example, if an AWT system includes an aerial vehicle and an emergency recovery system (and assuming energy among other components of the AWT system was conserved), energy may be transferred from the emergency recovery system to the aerial vehicle.

As such, the total mechanical energy of the AWT system may be equal to the sum of a mechanical energy of an aerial vehicle and a mechanical energy of an emergency recovery system. In other words, the total mechanical energy of the AWT system may be equal to the sum of a potential energy of the aerial vehicle, a kinetic energy of the aerial vehicle, a potential energy of the emergency recovery system, and the kinetic energy of an emergency recovery system. The following equations provide an example of this relationship (where $T_{AWT}$ is the total mechanical energy of an AWT system, $T_{Aerial\ Vehicle}$ is the total mechanical energy of an aerial vehicle, $T_{Emergency\ Recovery}$ is the total mechanical energy of an emergency recovery system, $KE_{Aerial\ Vehicle}$ is the kinetic energy of the aerial vehicle, $KE_{Emergency\ Recovery}$ is the kinetic energy of the emergency recovery system, $PE_{Aerial\ Vehicle}$ is the potential energy of the aerial vehicle, and $PE_{Emergency\ Recovery}$ is the potential energy of the emergency recovery system):

$$T_{AWT} = T_{Aerial\ Vehicle} + T_{Emergency\ Recovery},\ \text{where}$$

$$T_{Aerial\ Vehicle} = KE_{Aerial\ Vehicle} + PE_{Aerial\ Vehicle},\ \text{and}$$

$$T_{Emergency\ Recovery} = KE_{Emergency\ Recovery} + PE_{Emergency\ Recovery}$$

Therefore, considering the described principles, a potential energy of an emergency recovery system may be transferred to the aerial vehicle to increase to at least one of the kinetic energy of the aerial vehicle or the potential energy of the aerial vehicle. In some aspects, mechanical energy may be transferred to the aerial vehicle by applying a force to the aerial vehicle. The force may be applied based on increasing a tension in the tether. The tension in the tether may be increased by releasing a mass possessing gravitational potential energy and coupled to the tether within an emergency recovery system. Release of the mass causes the mass to drop and pull on the tether, thus increasing the tension in the tether.

From time to time, an AWT system, or more particularly an aerial vehicle of the AWT system, may experience a power loss while the aerial vehicle is in flight. The power loss may occur for a variety of reasons. In some scenarios, the aerial vehicle may lack an amount of power necessary to remain in flight. For example, an electrical connection supplying power may fail, or a wind speed may lessen to a point such that the aerial vehicle begins to lose the necessary lift forces to maintain the aerial vehicle in flight. In another example, a control system failure may also result in the aerial vehicle losing power and begin to lose the ability to remain in flight. A variety of other scenarios may exist that result in a loss of mechanical energy at the aerial vehicle.

Within some examples, a loss of energy that causes the aerial vehicle to become unable to maintain flight may trigger an emergency recovery system to supply or transfer mechanical energy to the aerial vehicle. Energy transferred may previously be stored in the emergency recovery system. Such a transfer may be triggered by the aerial vehicle switching from a flight mode to an emergency recovery mode. In some instances, the transfer of mechanical energy to the aerial vehicle may provide the aerial vehicle with enough energy to perform a preventative maneuver that prevents the aerial from crashing or otherwise becoming or causing damage or injury. Within examples, the preventative maneuver may be considered an emergency maneuver.

The emergency recovery system includes a mass and a connector that is configured to hold the mass at an elevation. The mass possesses a gravitational potential energy and is configured such that stored potential energy of the mass can be transferred to an aerial vehicle. Within some embodiments, the mass is coupled to a proximal portion of a tether and an aerial vehicle is coupled to a distal portion of the tether. In some instances, the emergency recovery system may be included as part of a ground station of the AWT system. In other instances, the emergency recovery system may be separate from the ground station. If the aerial vehicle experiences a loss of power such that the aerial vehicle cannot recover, the connector releases the mass thereby causing the mass to drop. As the mass drops, the mass applies a force on the tether such that a tension of the tether increases. By increasing the tension of the tether, the force is applied to the aerial vehicle such that a mechanical energy of the aerial vehicle increases. The mechanical energy of the aerial vehicle is increased by an amount that is equal to a value of the increased tension multiplied by a distance the mass has dropped (e.g. the elevation). Therefore, by releasing the mass, energy may be transferred from the falling mass to the aerial vehicle via the tether.

Beneficially, the embodiments described herein may be used to maintain an aerial vehicle in flight, or recover an aerial vehicle that has experience a loss of power and cannot remain in flight. A mechanical system may be utilized to increase a mechanical energy of the aerial vehicle when the aerial vehicle has experienced such a power loss. Increasing the mechanical energy of the aerial vehicle may prevent a crash that may cause injuries to humans and/or damage to the aerial vehicle or surrounding structures. Additionally, increasing the mechanical energy of the aerial vehicle may provide for a controlled landing of the aerial vehicle, such as an emergency landing at a predetermined recovery landing area.

Detailed descriptions of the Figures are included below. As illustrations, the Figures may not reflect actual operating conditions, but are merely to illustrate embodiments described. For example, while a perfectly straight tether may be used to illustrate the described tether embodiments, during orbiting crosswind flight the tether may in practice exhibit some level of droop between the ground station and the aerial vehicle. Further still, the relative dimensions in the Figures may not be to scale, but are merely to illustrate the embodiments described.

II. ILLUSTRATIVE SYSTEMS

A. Airborne Wind Turbine (AWT)

FIG. 1 depicts an AWT 100, according to an example embodiment. In particular, the AWT 100 includes a ground station 110, a tether 120, and an aerial vehicle 130. As shown in FIG. 1, the aerial vehicle 130 may be connected to the tether 120, and the tether 120 may be connected to the ground station 110. In this example, the tether 120 may be attached to the ground station 110 at one location on the ground station 110, and attached to the aerial vehicle 130 at two locations on the aerial vehicle 130. However, in other examples, the tether 120 may be attached at multiple locations to any part of the ground station 110 and/or the aerial vehicle 130.

The ground station 110 may be configured to hold and/or support the aerial vehicle 130 until it is in an operational mode. The ground station 110 also may be configured to allow for the repositioning of the aerial vehicle 130 such that deployment of aerial vehicle 130 is possible. Further, the ground station 110 may be configured to receive the aerial vehicle 130 during a landing. The ground station 110 may be formed of any material that can suitably keep the aerial vehicle 130 attached and/or anchored to the ground while in hover flight, forward flight, and/or crosswind flight. In some implementations, a ground station 110 may be configured for use on land. However, a ground station 110 also may be implemented on a body of water, such as a lake, river, sea, or ocean. For example, a ground station could include or be arranged on a floating offshore platform or a boat, among other possibilities. Further, a ground station 110 may be configured to remain stationary or to move relative to the ground or the surface of a body of water.

In addition, the ground station 110 may include one or more components (not shown), such as a winch, that may vary a length of the deployed tether 120. For example, when the aerial vehicle 130 is deployed, the one or more components may be configured to pay out and/or reel out the tether 120. In some implementations, the one or more components may be configured to pay out and/or reel out the tether 120 to a predetermined length. As examples, the predetermined length could be equal to or less than a maximum length of the tether 120. Further, when the aerial vehicle 130 lands in the ground station 110, the one or more components may be configured to reel in the tether 120.

Within some embodiments, the ground station 110 may include a mass (not shown) that may be coupled to the tether 120 and/or a connector (not shown). The mass and the connector may be part of an emergency recovery system or apparatus. The connector may be configured to releasably hold the mass at an elevation. In some aspects, the mass may possess a gravitational potential energy based on a weight of the mass and the elevation of the mass over a ground surface or a drop area surface. The connector may release the mass causing the mass to drop such that the mass pulls on the tether 120. By pulling on the tether 120, releasing the mass may result in an increase in a tension on the tether 120. In some embodiments, the emergency recovery system or apparatus may not be part of the ground station 110.

The tether 120 may transmit electrical energy generated by the aerial vehicle 130 to the ground station 110. In addition, the tether 120 may transmit electricity to the aerial vehicle 130 in order to power the aerial vehicle 130 for takeoff, landing, hover flight, and/or forward flight. The tether 120 may be constructed in any form and using any material which may allow for the transmission, delivery, and/or harnessing of electrical energy generated by the aerial vehicle 130 and/or transmission of electricity to the aerial vehicle 130. The tether 120 may also be configured to withstand one or more forces of the aerial vehicle 130 when the aerial vehicle 130 is in an operational mode. For example, the tether 120 may include a core configured to withstand one or more forces of the aerial vehicle 130 when the aerial vehicle 130 is in hover flight, forward flight, and/or crosswind flight. In some examples, the tether 120 may have a fixed length and/or a variable length. For instance, in at least one such example, the tether 120 may have a length of 140 meters.

The aerial vehicle 130 may be configured to fly substantially along a closed path 150 to generate electrical energy. The term "substantially along," as used in this disclosure, refers to exactly along and/or one or more deviations from exactly along that do not significantly impact generation of electrical energy.

The aerial vehicle 130 may include or take the form of various types of devices, such as a kite, a helicopter, a wing and/or an airplane, among other possibilities. The aerial vehicle 130 may be formed of solid structures of metal, plastic and/or other polymers. The aerial vehicle 130 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction.

The closed path 150 may be various different shapes in various different embodiments. For example, the closed path 150 may be substantially circular. And in at least one such example, the closed path 150 may have a radius of up to 265 meters. The term "substantially circular," as used in this disclosure, refers to exactly circular and/or one or more deviations from exactly circular that do not significantly impact generation of electrical energy as described herein. Other shapes for the closed path 150 may be an oval, such as an ellipse, the shape of a jelly bean, the shape of the number of 8, etc.

The aerial vehicle 130 may be operated to travel along one or more revolutions of the closed path 150.

B. Illustrative Components of an AWT

Figure 2:
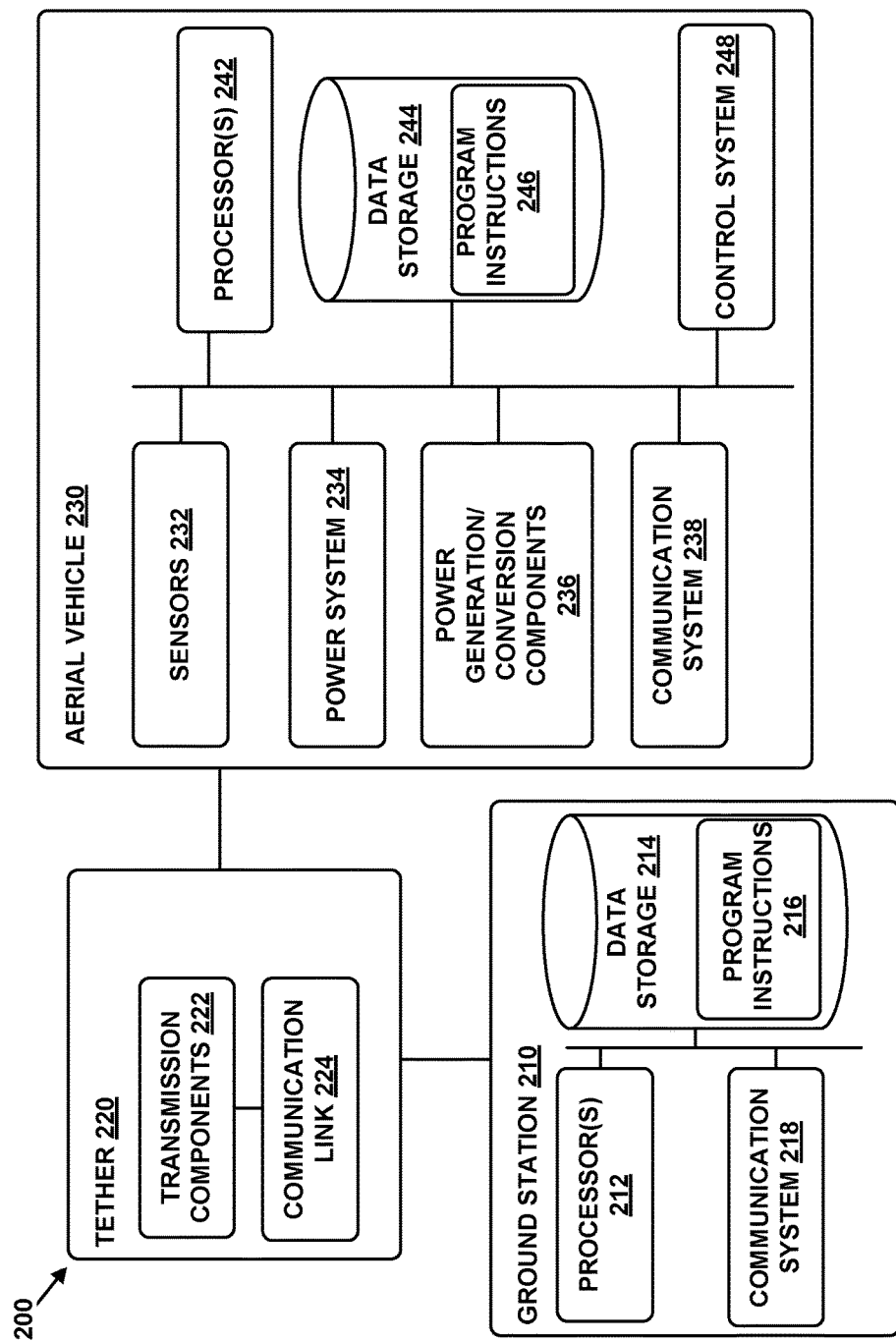
FIG. 2 is a simplified block diagram illustrating components of an AWT, according to an example embodiment.

FIG. 2 is a simplified block diagram illustrating components of the AWT 200. The AWT 100 may take the form of or be similar in form to the AWT 200. In particular, the AWT 200 includes a ground station 210, a tether 220, and an aerial vehicle 230. The ground station 110 may take the form of or be similar in form to the ground station 210, the tether 120 may take the form of or be similar in form to the tether 220, and the aerial vehicle 130 may take the form of or be similar in form to the aerial vehicle 230.

As shown in FIG. 2, the ground station 210 may include one or more processors 212, data storage 214, and program instructions 216. A processor 212 may be a general-purpose processor or a special purpose processor (e.g., digital signal processors, application specific integrated circuits, etc.). The one or more processors 212 can be configured to execute computer-readable program instructions 216 that are stored in a data storage 214 and are executable to provide at least part of the functionality described herein.

The data storage 214 may include or take the form of one or more computer-readable storage media that may be read or accessed by at least one processor 212. The one or more computer-readable storage media can include volatile and/or non-volatile storage components, such as optical, magnetic, organic or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 210. As such, the data storage 214 may include program instructions to perform or facilitate some or all of the functionality described herein.

In a further respect, the ground station 210 may include a communication system 218. The communication system 218 may include one or more wireless interfaces and/or one or more wireline interfaces, which allow the ground station 210 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. The ground station 210 may communicate with the aerial vehicle 230, other ground stations, and/or other entities (e.g., a command center) via the communication system 218.

In an example embodiment, the ground station 210 may include communication systems 218 that allows for both short-range communication and long-range communication. For example, the ground station 210 may be configured for short-range communications using Bluetooth and for long-range communications under a CDMA protocol. In such an embodiment, the ground station 210 may be configured to function as a "hot spot"; or in other words, as a gateway or proxy between a remote support device (e.g., the tether 220, the aerial vehicle 230, and other ground stations) and one or more data networks, such as cellular network and/or the Internet. Configured as such, the ground station 210 may facilitate data communications that the remote support device would otherwise be unable to perform by itself.

For example, the ground station 210 may provide a WiFi connection to the remote device, and serve as a proxy or gateway to a cellular service provider's data network, which the ground station 210 might connect to under an LTE or a 3G protocol, for instance. The ground station 210 could also serve as a proxy or gateway to other ground stations or a command center, which the remote device might not be able to otherwise access.

Moreover, as shown in FIG. 2, the tether 220 may include transmission components 222 and a communication link 224. The transmission components 222 may be configured to transmit electrical energy from the aerial vehicle 230 to the ground station 210 and/or transmit electrical energy from the ground station 210 to the aerial vehicle 230. The transmission components 222 may take various different forms in various different embodiments. For example, the transmission components 222 may include one or more electrical conductors that are configured to transmit electricity. And in at least one such example, the one or more electrical conductors may include aluminum and/or any other material which allows for the conduction of electric current. Moreover, in some implementations, the transmission components 222 may surround a core of the tether 220 (not shown).

The ground station 210 could communicate with the aerial vehicle 230 via the communication link 224. The communication link 224 may be bidirectional and may include one or more wired and/or wireless interfaces. Also, there could be one or more routers, switches, and/or other devices or networks making up at least a part of the communication link 224.

Further, as shown in FIG. 2, the aerial vehicle 230 may include one or more sensors 232, a power system 234, power generation/conversion components 236, a communication system 238, one or more processors 242, data storage 244, program instructions 246, and a control system 248.

The sensors 232 could include various different sensors in various different embodiments. For example, the sensors 232 may include a global positioning system (GPS) receiver. The GPS receiver may be configured to provide data that is typical of well-known GPS systems (which may be referred to as a global navigation satellite system (GNNS)), such as the GPS coordinates of the aerial vehicle 230. Such GPS data may be utilized by the AWT 200 to provide various functions described herein.

As another example, the sensors 232 may include one or more wind sensors, such as one or more pitot tubes. The one or more wind sensors may be configured to detect apparent and/or relative wind. Such wind data may be utilized by the AWT 200 to provide various functions described herein.

Still as another example, the sensors 232 may include an inertial measurement unit (IMU). The IMU may include both an accelerometer and a gyroscope, which may be used together to determine the orientation of the aerial vehicle 230. In particular, the accelerometer can measure the orientation of the aerial vehicle 230 with respect to earth, while the gyroscope measures the rate of rotation around an axis, such as a centerline of the aerial vehicle 230. IMUs are commercially available in low-cost, low-power packages. For instance, the IMU may take the form of or include a miniaturized MicroElectroMechanical System (MEMS) or a NanoElectroMechanical System (NEMS). Other types of IMUs may also be utilized. The IMU may include other sensors, in addition to accelerometers and gyroscopes, which may help to better determine position. Two examples of such sensors are magnetometers and pressure sensors. Other examples are also possible.

While an accelerometer and gyroscope may be effective at determining the orientation of the aerial vehicle 230, slight errors in measurement may compound over time and result in a more significant error. However, an example aerial vehicle 230 may be able to mitigate or reduce such errors by using a magnetometer to measure direction. One example of a magnetometer is a low-power, digital 3-axis magnetometer, which may be used to realize an orientation independent electronic compass for accurate heading information. However, other types of magnetometers may be utilized as well.

The aerial vehicle 230 may also include a pressure sensor or barometer, which can be used to determine the altitude of the aerial vehicle 230. Alternatively, other sensors, such as sonic altimeters or radar altimeters, can be used to provide an indication of altitude, which may help to improve the accuracy of and/or prevent drift of the IMU. In addition, the aerial vehicle 230 may include one or more load cells configured to detect forces distributed between a connection of the tether 220 to the aerial vehicle 230.

As noted, the aerial vehicle 230 may include the power system 234. The power system 234 could take various different forms in various different embodiments. For example, the power system 234 may include one or more batteries for providing power to the aerial vehicle 230. In some implementations, the one or more batteries may be rechargeable and each battery may be recharged via a wired connection between the battery and a power supply and/or via a wireless charging system, such as an inductive charging system that applies an external time-varying magnetic field to an internal battery and/or charging system that uses energy collected from one or more solar panels.

As another example, the power system 234 may include one or more motors or engines for providing power to the aerial vehicle 230. In some implementations, the one or more motors or engines may be powered by a fuel, such as a hydrocarbon-based fuel. And in such implementations, the fuel could be stored on the aerial vehicle 230 and delivered to the one or more motors or engines via one or more fluid conduits, such as piping. In some implementations, the power system 234 may be implemented in whole or in part on the ground station 210.

As noted, the aerial vehicle 230 may include the power generation/conversion components 236. The power generation/conversion components 236 could take various different forms in various different embodiments. For example, the power generation/conversion components 236 may include one or more generators, such as high-speed, direct-drive generators. With this arrangement, the one or more generators may be driven by one or more rotors. And in at least one such example, the one or more generators may operate at full rated power wind speeds of 11.5 meters per second at a capacity factor which may exceed 60 percent, and the one or more generators may generate electrical power from 40 kilowatts to 600 megawatts.

Moreover, as noted, the aerial vehicle 230 may include a communication system 238. The communication system 238 may take the form of or be similar in form to the communication system 218. The aerial vehicle 230 may communicate with the ground station 210, other aerial vehicles, and/or other entities (e.g., a command center) via the communication system 238.

In some implementations, the aerial vehicle 230 may be configured to function as a "hot spot"; or in other words, as a gateway or proxy between a remote support device (e.g., the ground station 210, the tether 220, other aerial vehicles) and one or more data networks, such as cellular network and/or the Internet. Configured as such, the aerial vehicle 230 may facilitate data communications that the remote support device would otherwise be unable to perform by itself.

For example, the aerial vehicle 230 may provide a WiFi connection to the remote device, and serve as a proxy or gateway to a cellular service provider's data network, which the aerial vehicle 230 might connect to under an LTE or a 3G protocol, for instance. The aerial vehicle 230 could also serve as a proxy or gateway to other aerial vehicles or a command station, which the remote device might not be able to otherwise access.

As noted, the aerial vehicle 230 may include the one or more processors 242, the program instructions 246, and the data storage 244. The one or more processors 242 can be configured to execute computer-readable program instructions 246 that are stored in the data storage 244 and are executable to provide at least part of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aerial vehicle 230 may include the control system 248. In some implementations, the control system 248 may be configured to perform one or more functions described herein. The control system 248 may be implemented with mechanical systems and/or with hardware, firmware, and/or software. As one example, the control system 248 may take the form of program instructions stored on a non-transitory computer readable medium and a processor that executes the instructions. The control system 248 may be implemented in whole or in part on the aerial vehicle 230 and/or at least one entity remotely located from the aerial vehicle 230, such as the ground station 210. Generally, the manner in which the control system 248 is implemented may vary, depending upon the particular application.

While the aerial vehicle 230 has been described above, it should be understood that the methods and systems described herein could involve any suitable aerial vehicle that is connected to a tether, such as the tether 220 and/or the tether 120.

C. Illustrative Aerial Vehicle

Figure 3:
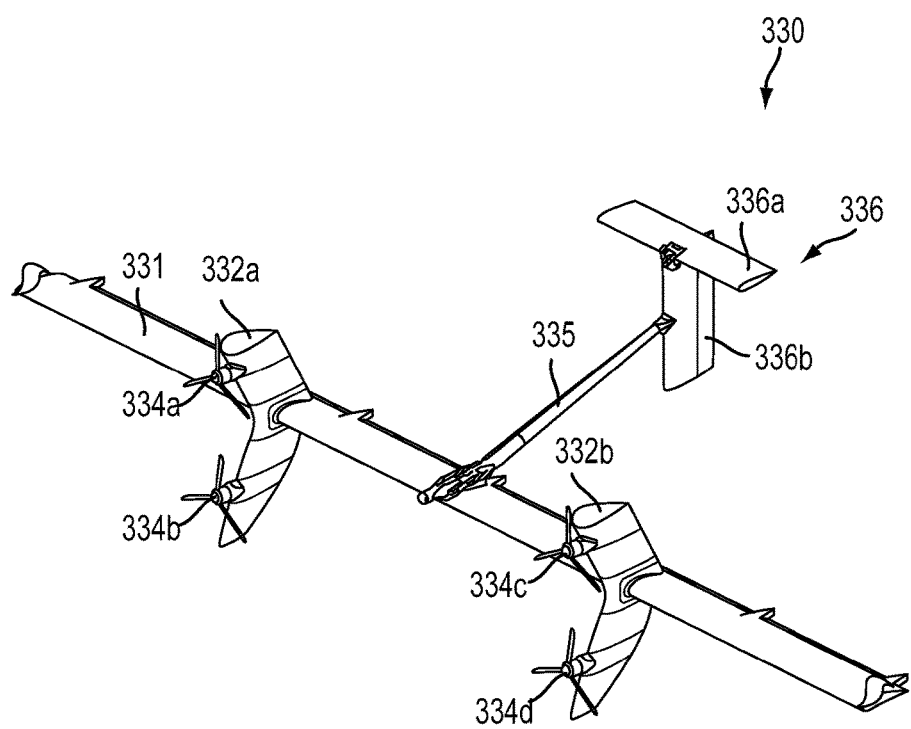
FIG. 3 depicts an aerial vehicle, according to an example embodiment.

FIG. 3 depicts an aerial vehicle 330, according to an example embodiment. The aerial vehicle 130 and/or the aerial vehicle 230 may take the form of or be similar in form to the aerial vehicle 330. In particular, the aerial vehicle 330 may include a main wing 331, pylons 332a, 332b, rotors 334a, 334b, 334c, 334d, a tail boom 335, and a tail wing assembly 336. Any of these components may be shaped in any form which allows for the use of components of lift to resist gravity and/or move the aerial vehicle 330 forward.

The main wing 331 may provide a primary lift force for the aerial vehicle 330. The main wing 331 may be one or more rigid or flexible airfoils, and may include various control surfaces, such as winglets, flaps (e.g., Fowler flaps, Hoerner flaps, split flaps, and the like), rudders, elevators, spoilers, dive brakes, etc. The control surfaces may be used to stabilize the aerial vehicle 330 and/or reduce drag on the aerial vehicle 330 during hover flight, forward flight, and/or crosswind flight.

The main wing 331 and pylons 332a, 332b may be any suitable material for the aerial vehicle 330 to engage in hover flight, forward flight, and/or crosswind flight. For example, the main wing 331 and pylons 332a, 332b may include carbon fiber and/or e-glass, and include internal supporting spars or other structures. Moreover, the main wing 331 and pylons 332a, 332b may have a variety of dimensions. For example, the main wing 331 may have one or more dimensions that correspond with a conventional wind turbine blade. As another example, the main wing 331 may have a span of 8 meters, an area of 4 meters squared, and an aspect ratio of 15.

The pylons 332a, 332b may connect the rotors 334a, 334b, 334c, and 334d to the main wing 331. In some examples, the pylons 332a, 332b may take the form of, or be similar in form to, a lifting body airfoil (e.g., a wing). In some examples, a vertical spacing between corresponding rotors (e.g., rotor 334a and rotor 334b on pylon 332a) may be 0.9 meters.

The rotors 334a, 334b, 334c, and 334d may be configured to drive one or more generators for the purpose of generating electrical energy. In this example, the rotors 334a, 334b, 334c, and 334d may each include one or more blades, such as three blades or four blades. The rotor blades may rotate via interactions with the wind and be used to drive the one or more generators. In addition, the rotors 334a, 334b, 334c, and 334d may also be configured to provide thrust to the aerial vehicle 330 during flight. With this arrangement, the rotors 334a, 334b, 334c, and 334d may function as one or more propulsion units, such as a propeller. Although the rotors 334a, 334b, 334c, and 334d are depicted as four rotors in this example, in other examples the aerial vehicle 330 may include any number of rotors, such as less than four rotors or more than four rotors (e.g., eight rotors).

A tail boom 335 may connect the main wing 331 to the tail wing assembly 336, which may include a tail wing 336a and a vertical stabilizer 336b. The tail boom 335 may have a variety of dimensions. For example, the tail boom 335 may have a length of 2 meters. Moreover, in some implementations, the tail boom 335 could take the form of a body and/or fuselage of the aerial vehicle 330. In such implementations, the tail boom 335 may carry a payload.

The tail wing 336a and/or the vertical stabilizer 336b may be used to stabilize the aerial vehicle 330 and/or reduce drag on the aerial vehicle 330 during hover flight, forward flight, and/or crosswind flight. For example, the tail wing 336a and/or the vertical stabilizer 336b may be used to maintain a pitch of the aerial vehicle 330 during hover flight, forward flight, and/or crosswind flight. The tail wing 336a and the vertical stabilizer 336b may have a variety of dimensions. For example, the tail wing 336a may have a length of 2 meters. Moreover, in some examples, the tail wing 336a may have a surface area of 0.45 meters squared. Further, in some examples, the tail wing 336a may be located 1 meter above a center of mass of the aerial vehicle 330.

While the aerial vehicle 330 has been described above, it should be understood that the systems described herein could involve any suitable aerial vehicle that is connected to an airborne wind turbine tether, such as the tether 120 and/or the tether 220.

III. ILLUSTRATIVE EMERGENCY RECOVERY SYSTEMS

Figure 4:
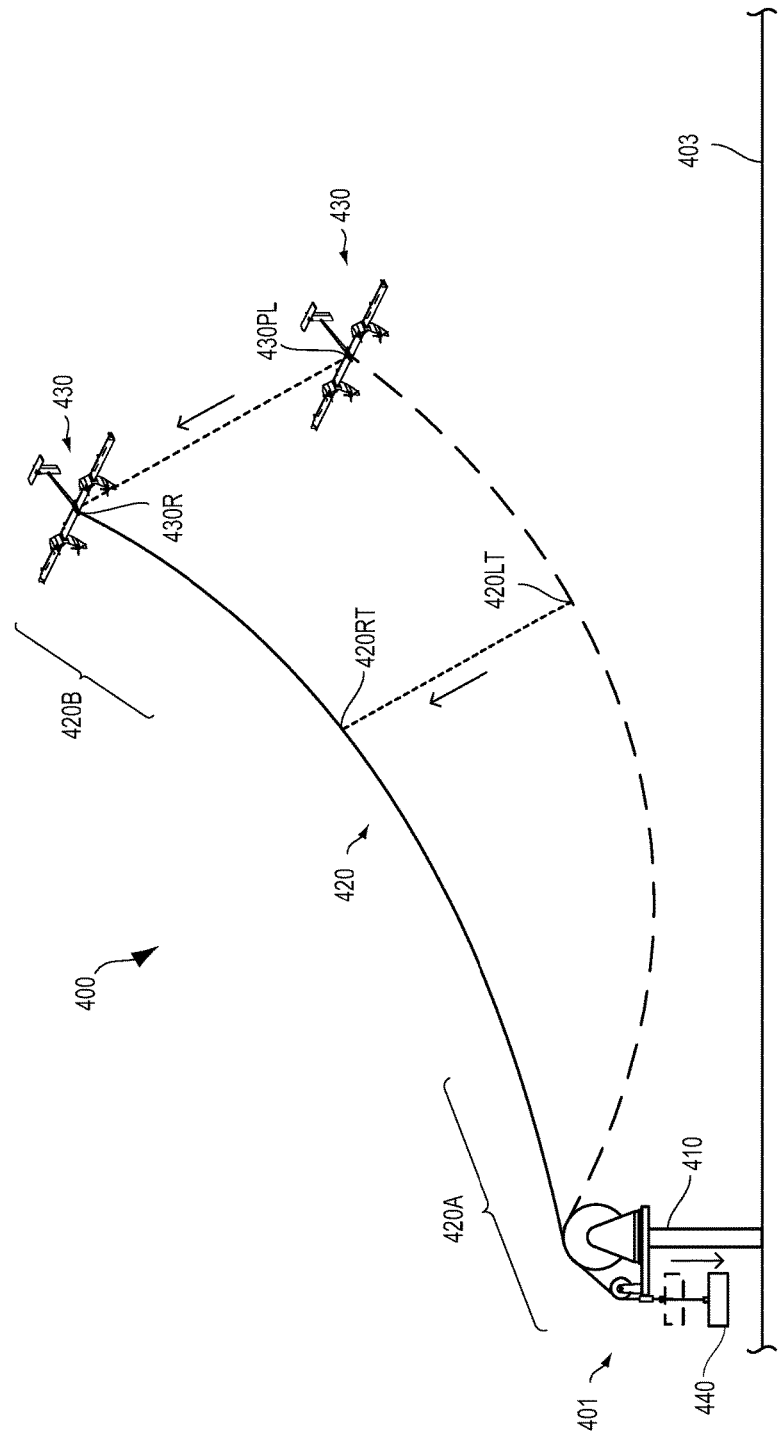
FIG. 4 depicts an AWT, according to an example embodiment.

FIG. 4 depicts an AWT system 400, according to an example embodiment. The AWT system 400 includes an emergency recovery apparatus 401, a ground station 410, a tether 420, and an aerial vehicle 430. The emergency recovery apparatus 401 includes include a mass 440. Furthermore, the tether 420 may include a proximal portion 420A and a distal portion 420B. The mass 440 is coupled to the proximal portion 420A of the tether 420 and the aerial vehicle 430 is coupled to the distal portion 420B. Also, the tether 420 is coupled to the ground station 410 at the proximal portion 420A. As such, when the aerial vehicle 430 is in flight, the tether 420 is under tension.

The ground station 410 may be installed at a variety of locations. In some examples, such as depicted in FIG. 4, the ground station 410 may be located onshore and fixedly installed on a ground surface 403. In other examples, the ground station 410 may be located offshore and may possibly be coupled to a floating platform. Within embodiments, the emergency recovery apparatus 401 may be located at or near the ground station 410.

While the aerial vehicle 430 is in flight, for example a crosswind flight, the aerial vehicle 430 may experience some type of power loss or failure. As a result of the power failure, the aerial vehicle 430 may a decrease in mechanical energy and may lose the ability to stay in flight. One indication that the aerial vehicle 430 may have lost power and is experiencing a decrease in mechanical energy may include a decrease in the tension in the tether 420. For example, FIG. 4 illustrates the aerial vehicle 430 in a power loss position 430PL. While the aerial vehicle 430 is in the power loss position 430PL, the aerial vehicle 430 may be at a lower altitude and the tether 430 may have a decreased tension as shown by a low-tension position 420LT of the tether 420. In some implementations, a drop in the tension of the tether 420 below a threshold value may indicate that the aerial vehicle 430 has lost power and/or is otherwise losing altitude. The threshold value may be a predetermined minimum tension value that maintains the aerial vehicle in flight.

In order to prevent the aerial vehicle 430 from crashing or becoming damaged, energy may be transferred to the aerial vehicle 430 so that the aerial vehicle 430 may perform a preventative maneuver. The preventative maneuver may provide the aerial vehicle 430 the ability to remain in flight or perform a controlled emergency landing. Within examples, when the aerial vehicle 430 loses power, the aerial vehicle 430 may switch from an operational mode to an emergency recovery mode.

One potential preventative maneuver may include a glide maneuver towards a predetermined landing area. As such, the energy transferred to the aerial vehicle 430 would be enough for the aerial vehicle 430 to safely land at the predetermined landing area and then be recovered. The predetermined landing area may include a runway or the ground station 410, among other examples. Thus, by performing the transfer of energy, a crash landing or other catastrophic failure event may be prevented.

However, because the aerial vehicle 430 may be experiencing a power loss, an electrical system may not be able to provide the aerial vehicle 430 with any additional power. Thus, in order to transfer energy to the aerial vehicle 430, the AWT system 400 may include a mechanical apparatus or system, such as the emergency recovery apparatus 401. Within embodiments, the emergency recovery apparatus 401 may store potential energy and may be configured to transfer at least a portion of the stored energy to the aerial vehicle 430. The stored potential energy may be in the form of gravitational potential energy. The emergency recovery apparatus 401, particularly the mass 440, may be coupled to the proximal portion of the tether 420. In some implementations, the emergency recovery apparatus 401 includes the mass 440 suspended at an elevation. Because the mass 440 is suspended at the elevation, the mass 440 may possess or store a gravitational potential energy.

As illustrated in FIG. 4, the mass 440 is suspended at an elevation over a ground surface 403. The mass 440 may be releasably held at the elevation by a connector (not shown) that is part of the emergency recovery apparatus 401. Upon release by the connector, the mass 440 may drop from the elevation, therefore pulling the tether 420. By pulling on the tether 420, a tension of the tether 420 may be increased. Increasing the tension of the tether 420 applies a force to the aerial vehicle 430.

In some examples, the mass 440 may include a solid material, such as a solid block of a metal, or an alloy, or another material. In other examples, the mass 440 may include a container that is filled with a material. The material that may fill the container may include a liquid, such as water. In yet even other examples, the container may be filled with sand. Within embodiments, when the mass 440 includes a container, the container may be filled based on a predetermined gravitational potential energy such that the container has a predetermined weight. The predetermined gravitational energy and/or the predetermined weight may be based on a preventative maneuver for the aerial vehicle 430 to perform.

The tether 420 may experience an increase in the tension by the pulling of the mass 440 on the tether 420, and via the increase in the tension, the aerial vehicle 430 may experience a force causing an increase in mechanical energy. FIG. 4 illustrates the increase in the tension of the tether 420 and the increase in the mechanical energy of the aerial vehicle by depicting the aerial vehicle 430 moving from the power loss position 430PL to the recovered position 430R. Similarly, FIG. 4 illustrates in the increase in the tension of the tether 430 by the tether moving from the low-tension position 420LT to the recovered tension position 420RT.

As such, from the recovered position 430R, the aerial vehicle 430 may be able to perform a preventative maneuver because of the increase in mechanical energy. In least one example, the increase in mechanical energy may be an increase in a kinetic energy of the aerial vehicle 430, for example an increase in airspeed of the aerial vehicle 430. In another example, the increase in mechanical energy may be an increase in a potential energy of the aerial vehicle 430, for example, an increase in an altitude of the aerial vehicle 430. In yet another example, the increase in mechanical energy may be an increase in both the kinetic energy and the potential energy of the aerial vehicle 430. Therefore, within examples, transitioning the aerial vehicle 430 from an operational mode to an emergency mode may include increasing a mechanical energy of the aerial vehicle 430 by increasing a tension in the tether 420 by releasing the mass 440 suspended at an elevation by a connector of the emergency recovery apparatus.

In some implementations, a preventative maneuver may require that the aerial vehicle 430 have a certain amount of mechanical energy in order for the aerial vehicle 430 to complete the preventive maneuver. A preventative maneuver energy may be the amount of mechanical energy necessary for the aerial vehicle 430 to perform the preventative maneuver. In some embodiments, the preventative maneuver energy may be predetermined. For example, in one example scenario, the preventative maneuver may include the aerial vehicle 430 gliding to a recovery landing area. It may be predetermined that the aerial vehicle 430 will need a specific number of kilowatt-hours of preventative maneuver energy to glide to the designated recovery landing area based on the features of the aerial vehicle 430 and how far the aerial vehicle 430 may need to travel to reach the recovery landing area. Furthermore, there may be a predetermined velocity and tension to be applied when the mass 440 is released. As such, a weight and the elevation of the mass 440 may be determined based on the preventative maneuver energy and the predetermined velocity and tension. In some examples, the preventative maneuver may be an emergency maneuver and correspondingly the preventative maneuver energy may be an emergency maneuver energy. Within embodiments, the weight of the mass may be less than a predetermined maximum threshold of the tension of the tether. In some instances, the predetermined maximum threshold of the tension may be an emergency rated tension of the tether.

Figure 5:
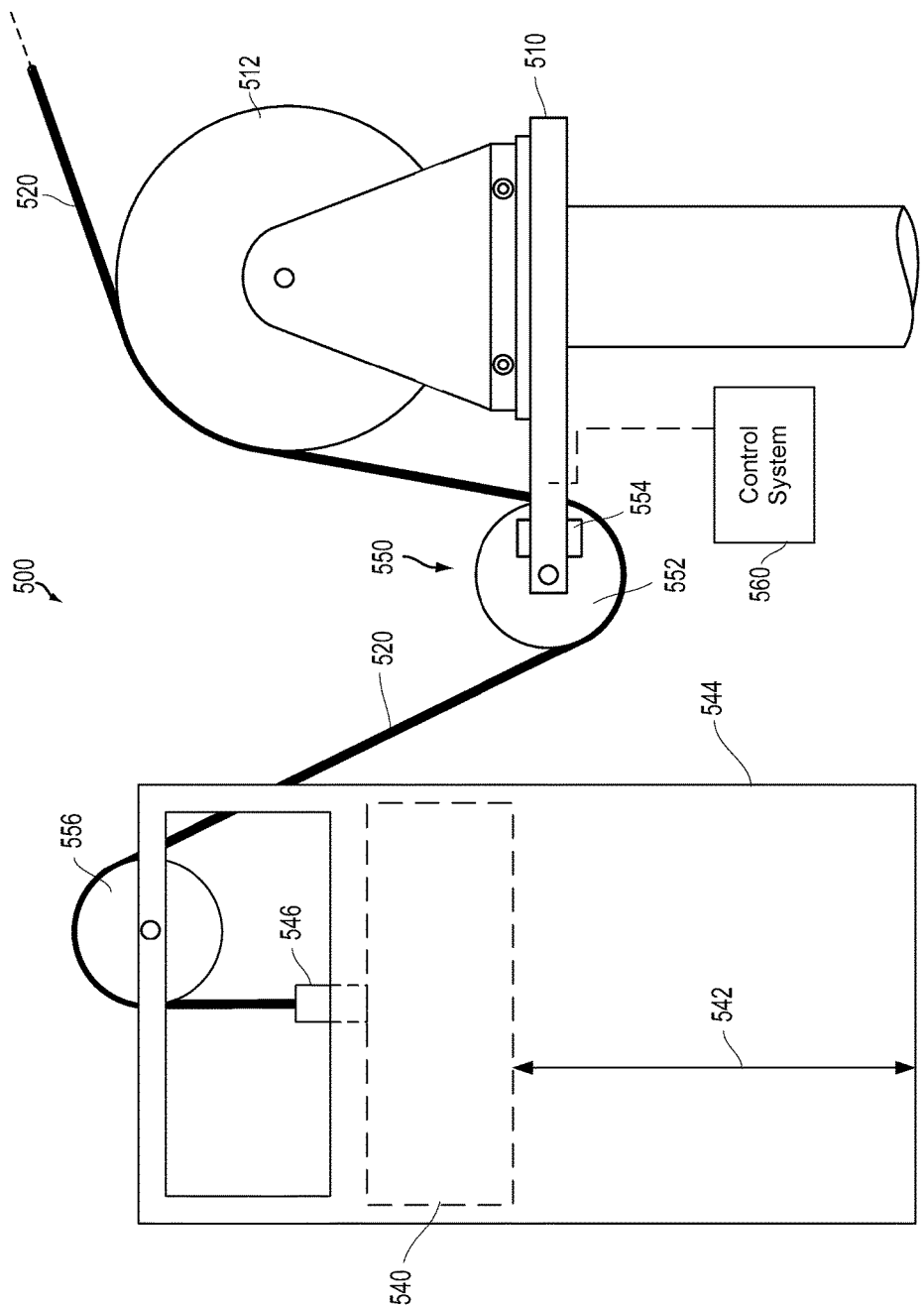
FIG. 5 depicts an emergency recovery system, according to an example embodiment.

FIG. 5 depicts an emergency recovery system 500, according to an example embodiment. The emergency recovery system 500 includes a ground station 510, a tether 520, a mass 540, an enclosure 544, a mass coupling 546, a connector 550, and a control system 560. The ground station 510 includes a drum 512. Furthermore, the mass 540 is held at an elevation 542. In some embodiments, the connector 550 includes a disc 552, a brake 554, and a pulley 556. An aerial vehicle (not shown) is coupled to a distal portion of the tether 520.

The emergency recovery system 500 may be part of an AWT system, such as the AWT 100 of FIG. 1, the AWT 200 of FIG. 2, and or the AWT system 400 of FIG. 4. Furthermore, the emergency recovery system 500 may include similar aspects to the emergency recovery apparatus 401 of FIG. 4. As such, components of the emergency recovery system 500 may include components that may have the same configuration and/or function in a similar manner as other aspects of the AWT 100, the AWT 200, and/or the emergency recovery apparatus 401. Further, the tether 520 may be similar to the tether 120 of FIG. 1, the tether 220 of FIG. 2, or the tether 420 of FIG. 4. Additionally, the mass 540 may be similar to the mass 440 of FIG. 4.

The ground station 510 may be similar to the ground station 410 of FIG. 4. As illustrated in FIG. 5, the ground station 510 may include a drum 512. The tether 520 may be wound around the drum 512 during storage or during flight.

In some aspects, the drum 512 may reel in or pay out the tether 520. The drum 512 may reel in or pay out the tether 520 as part of landing or launching an aerial vehicle. As such, at least a portion of the tether 520 may be wound around the drum 512. The ground station 510 may include features to control a rotation of the drum 512. For example, the ground station 510 may include a motor coupled to the drum 512 to rotate the drum. While the aerial vehicle is in flight, the drum 512 may be locked in order to not rotate. In other examples, the drum 512 may be free to rotate a predetermined about while the aerial vehicle is in flight.

In some embodiments, such as illustrated in FIG. 5, the tether 520 may be coupled to the mass coupling 546. The mass coupling 546 may be configured such that the tether 520 may be coupled to the mass 540 via the mass coupling 546. The mass coupling 546 may be configured to accept an end of the tether 520, such as a termination (not shown) of the tether 520. In other examples, the mass coupling 546 may couple to another portion of the tether 520.

The mass 540 may possess a gravitational potential energy. The gravitational potential energy may be based on a weight of the mass 540 and the elevation 542 that the mass 540 may be held at. The mass 540 may be releasably held by the connector 550 the elevation 542. The elevation 542 may be a height that the mass 540 is held at above a ground surface (such as the ground surface 403 of FIG. 4) or a drop area. In some examples, the elevation 542 may be a distance that the mass 540 is configured to drop.

The enclosure 544 may surround at least a portion of a drop path of the mass 540. The mass 540 may travel through the enclosure 544 along the drop path when the mass 540 is released. The enclosure 544 may include a bottom section that may include the drop area. The drop area may be an area of the enclosure 544 that the mass 540 is held above. In some embodiments, the enclosure 544 may be located on the ground at or near the ground station 510. In other embodiments, the enclosure 544 may be, at least partially, under the ground. In example offshore embodiments, the enclosure 544 may be under or within the water at or near a floating platform. In other offshore embodiments, the enclosure 544 may include the floating platform.

In some embodiments, the enclosure 544 may also include a braking mechanism. The braking mechanism may be located on the bottom section of the enclosure 544. In some examples, the braking mechanism may be within a cavity of the enclosure located under the mass 540 when the mass 540 is suspended. The braking mechanism may be configured to control a rate of descent of the mass when the connector 550 is released. Controlling the rate of descent may provide control of a tension of the tether 520 or an airspeed of the aerial vehicle. There may be a predetermined maximum threshold for the tension of the tether 520 and as such controlling the rate of descent may allow the tension of the tether 520 to remain below the predetermined maximum threshold. In some examples, the braking mechanism may include a spring or a damper within the enclosure 544.

As depicted in FIG. 5, the connector 550 may include a disc 552 and a brake 554. The brake 554 may prevent the disc 552 from rotating. Based on friction between the tether 520 and the disc 552, by preventing the disc 552 from rotating, the brake 554 may maintain the mass 540 suspended at the elevation. Within some examples, the brake 554 may include a disc brake, a drum brake, or some other form of friction braking mechanism. As such, within some examples, the brake 554 may also act as a braking mechanism configured to control a rate of descent of the mass 540 when the connector 550 releases the mass 540.

In some implementations, the connector 550 may include other components to releasably hold the mass 540 at the elevation 542. For example, in some aspects the connector 550 may include a hydraulic or pneumatic clasp that may grip the tether 520 and thus hold the mass 540 at the elevation. In other examples, as shown in FIG. 5, the connector 550 may also include other support components such as a pulley 556 which may be installed as part of the enclosure 544. In yet other embodiments, a pulley system with more or less components than the pulley 556 may be included. Further, the pulley system may be used to create a gear ratio that may be used in order to determine the weight and/or the elevation 542 necessary to provide enough energy to the aerial vehicle when the mass 540 is released.

The emergency recovery system 500 may also include the control system 560. The control system 560 may be coupled to the ground station 510, the tether 520, and or the connector 550. Within some examples, the control system 560 may be in communication with an aerial vehicle, or more specifically a control system of the aerial vehicle (such as control system 248 of FIG. 2). As such, in some embodiments, the control system 560 may cause the aerial vehicle to launch from or land at the ground station 510. The control system 560 may also communicate and put the aerial vehicle in a flight mode or an operational mode. The flight mode of the aerial vehicle may include a time after when the aerial vehicle has been launched and before the aerial vehicle has landed. As such, the flight mode may include a launch mode, a land mode, and an operational mode, among others.

In some implementations, the control system 560 may be coupled to one or more sensors that may be coupled to the tether 520 and/or the aerial vehicle. In examples, the control system 560 may be coupled to a sensor or probe that is coupled to the tether 520 and is configured to determine a tension in the tether 520. Thus, while the aerial vehicle is in the flight mode, the control system 560 may monitor the tension of the tether 520. Furthermore, the control system 520 may be configured to determine whether the tension of the tether 520 is below a threshold value of tension. The threshold value may be a predetermined minimum tension value that maintains the aerial vehicle coupled to the tether in flight. Based on a determination that the tension in the tether is below the threshold value, the control system 560 may be configured to cause the connector 550 to release the mass 540. For example, as illustrated in FIG. 5, the control system 560 may cause the brake 554 of the connector 550 to release from the disc 552. By releasing the brake 554 of the connector 550, the disc 552 may be free to rotate and the mass 540 may be free to drop the elevation 542 to the drop area of the enclosure 544. The mass 540 may then pull on the tether 520 and thus cause an increase in the tension of tether 520.

The control system 560 may also be configured to put the AWT system in an emergency mode or emergency recovery mode. For example, responsive to determining that the tension in the tether is below the threshold tension value, the control system 560 may be further configured to transfer the AWT system from the flight mode to the emergency mode. The emergency mode may include the control system 560 being configured to cause the connector 550 to release the mass 540. As such, energy may be transferred to the aerial vehicle via the tether 520.

Furthermore, the control system 560 may be configured to cause the aerial vehicle to perform an emergency maneuver when the AWT system is put in emergency mode. The emergency maneuver may include the aerial vehicle flying to a higher altitude or at an increased airspeed than the aerial vehicle previously had. In some examples, the emergency maneuver may include utilizing energy transferred to the aerial vehicle from the mass 540 to glide to a recovery landing area. In some embodiments, the aerial vehicle may be detachably coupled to the tether 520 and after receiving the energy transferred by the mass 540, the control system 560 may be configured to detach the aerial vehicle from the tether 520 so the aerial vehicle may complete the emergency maneuver. Furthermore, the control system 560 may determine an amount of mechanical energy required by the aerial vehicle in order to perform the emergency maneuver.

In some examples, the amount of mechanical energy required may not require that the mass 540 drop the entire elevation 542, but only a distance that is a portion of the elevation 542. For example, the mass 540 may only be required to drop one half the elevation 542 in order for enough mechanical energy to be transferred from the mass 540 to the aerial vehicle in order for the aerial vehicle to perform the emergency maneuver. As such, the control system 560 may cause a braking mechanism, such as the brake 554, to be applied and therefore limit the distance that the mass 540 drops.

In other embodiments, the control system 560 may be coupled to the enclosure 544 or the aerial vehicle. In yet further embodiments, the control system 560 may be the same as or have similar functions to the control system 248 of the aerial vehicle 230 of FIG. 2. In other aspects, the control system 560 may be configured to operate or control other components of the AWT system, for example, a motor coupled to the drum 512 in order to reel in or pay out the aerial vehicle, among others.

Figure 6:
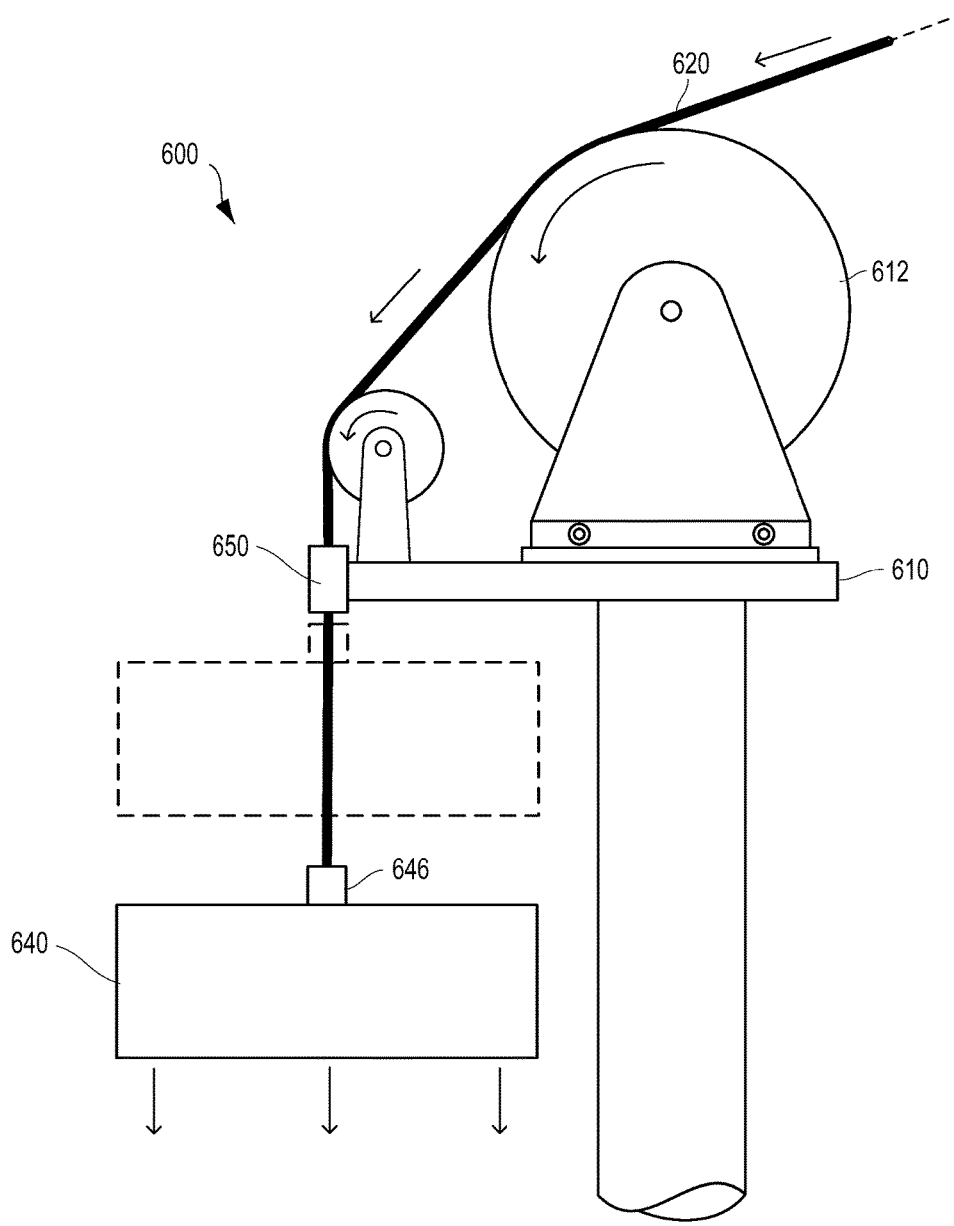
FIG. 6 depicts an emergency recovery system, according to an example embodiment.

FIG. 6 illustrates an emergency recovery system 600, according to an example embodiment. The emergency recovery system 600 includes a ground station 610, a drum 612, a tether 620, a mass 640, a mass coupling 646, and a connector 650. The emergency recovery system 600 may have a similar configuration or perform similar functions as the emergency recovery system 500 or the emergency recovery apparatus 401 of FIGS. 5 and 4 respectively.

As depicted in FIG. 6, the connector 650 may have released the mass 640 and therefore the mass 640 is falling from an elevation or a height that the connector 650 may have been holding the mass 640. The connector 650 may suspend or hold the mass 640 at the elevation by utilizing one or more gripping mechanisms on the tether 620. As such, the connector 605 may grip or hold the tether 620 and thus hold the mass 640 at the elevation. The tether 620 may be coupled to the mass 640 at the mass coupling 646.

In other embodiments, the mass coupling 646 may be part of the connector 650. The mass coupling 646 may be detachably coupled to the tether 620. In some embodiments, the connector 650 may be coupled to the mass coupling 646 such that the mass 640 is held at the elevation. As such, the mass 640 may be held at the elevation while the tether 620 is let out via the drum 612, and after the tether 620 is let out, a termination or end of the tether 620 may be coupled to the mass coupling 646. Similarly, the tether 620 may be decoupled from the mass coupling 646 such that the drum 612 may reel in the tether 620.

In further embodiments, the mass coupling 646 may couple to the tether 620 at another portion of the tether 620. For example, while the mass 640 is shown to be coupled at or near an end of the tether 620 on a distal portion of the tether 620 on a first side of the ground station 610, the mass 640 may be coupled to a proximal portion of the tether 620 on a second side of the ground station 610. In examples, the mass coupling 646 may be configured to releasably grasp a main tether body section of the tether 620.

The connector 650 may release the mass 640 based on a tension of the tether being below a threshold tension value. Within examples, the tension may be a mean tension of the tether 620 over a period of time. In other examples, the tension may be the mean tension of the tether 620 after a number of loops flown by the aerial vehicle. The connector 650 may be configured such that if the tension in the tether falls below the threshold value, the connector 650 is mechanically sprung open and thereby releases the mass 640. In other examples, the connector 650 may be coupled to a control system that determines the tension in the tether is below the threshold value. As such, the control system may trigger or cause the connector 650 to release the mass 640.

By releasing the mass 640, the falling mass 640 may pull on the tether 620 such that the tension in the tether 620 increases. Furthermore, increasing the tension of the tether 620 may cause a force to be applied to the aerial vehicle thus transferring energy from the falling mass 640 to the aerial vehicle via the tether 620. As such, the aerial vehicle may have increased energy to perform an emergency maneuver or other action.

Figure 7:
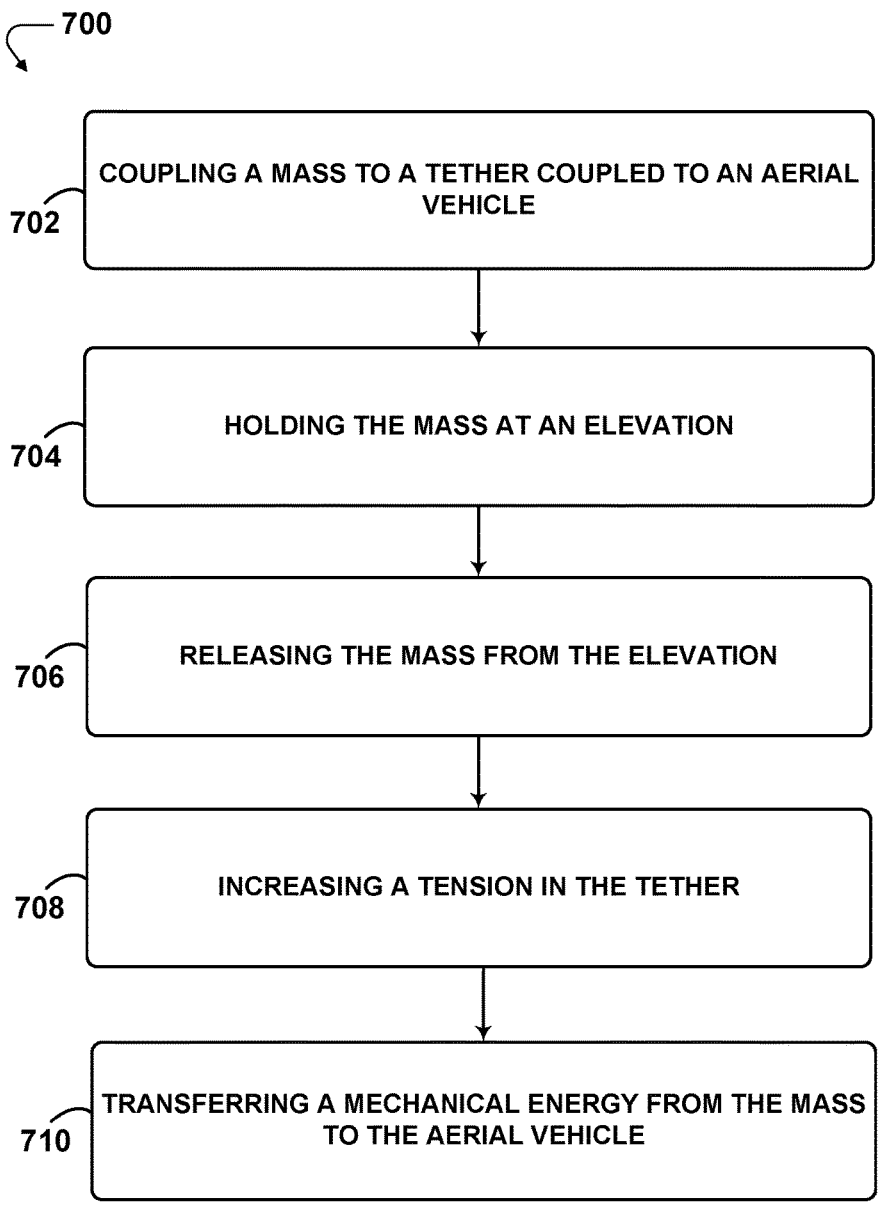
FIG. 7 depicts a simplified flowchart illustrating a method, according to an example embodiment.

FIG. 7 is a simplified block diagram illustrating a method 700 for transferring mechanical energy to an aerial vehicle, according to an example embodiment. In one example implementation, the method 700 describes releasing a mass coupled to a tether and transferring energy from the mass to the aerial vehicle.

Illustrative methods, such as method 700, may be carried out in whole or in part by a component(s) in an AWT system, such as one or more of the components in of the AWT 100 illustrated in FIG. 1, the AWT 200 as illustrated in FIG. 2, or the AWT system 400 as illustrated in FIG. 4. Furthermore, the method 700 may be carried out in whole or in party by an emergency recovery apparatus or system, such as the emergency recovery apparatus 401, the emergency recovery system 500, or the emergency recovery system 600 of FIGS. 4, 5, and 6, respectively. It should be understood that example methods, such as method 700, might be carried out by entities, or combinations of entities (i.e., by other computing devices, and/or combinations thereof), without departing from the scope of the invention.

For example, functions of the method 700 may be fully performed by a computing device (or components of a computing device such as one or more processors or controllers), or may be distributed across multiple components of the computing device, across multiple computing devices, and/or across a server. In some examples, the computing device may receive information from sensors of the computing device, or may receive information from other computing devices that collect the information. As with other examples, a computing device, a server, a control system, a ground station of an AWT, a vehicle of an AWT, or an AWT system may perform the method 700.

As shown by block 702, the method 700 includes coupling a mass to a tether. The mass may be coupled to a proximal portion of the tether. Additionally, a ground station may be coupled to the tether at the proximal portion. Within examples, an aerial vehicle may be coupled to a distal portion of the tether. The mass may be a component of an AWT system, or more specifically, an emergency recovery system such as those provided herein.

As shown by 704, the method 700 further includes holding the mass at an elevation. The mass may be held at the elevation by a connector, such as the connector 550 or the connector 650 of FIGS. 5 and 6 respectively. The mass may possess a gravitational potential energy that is based on a weight of the mass and the elevation of the mass. Within examples, the connector may grasp the mass or the tether, or may otherwise maintain a position of the mass at the elevation.

A control system or other computing device may determine that a tension in the tether is below a threshold value. The threshold value may be a predetermined minimum tension value that maintains the aerial vehicle coupled to the tether in flight. The control system may be coupled or otherwise be in communication with a sensor that is coupled to the tether in order to monitor the tension of the tether.

As shown by 706, the method 700 includes releasing the mass from the elevation. Releasing the mass from the elevation may include the connector releasing the mass and thus causing the mass to drop from the elevation. In some aspects, the control system may trigger the release of the mass, while in other aspects the release of the mass may be mechanically triggered by a tension in the tether falling below a threshold value. In other examples, an operator may trigger the release of the mass. One or more flight parameters (e.g. airspeed, altitude, flight time, tension in the tether, etc.) may be considered before triggering the release of the mass. As such, within examples, the mass may be released based on a determination about one or more flight parameters, such as those mentioned above.

Releasing the mass from the elevation may be based on determining that the tension in the tether is below a threshold value. In some aspects, the tension may include a mean tension over two or more loops around a closed path that an aerial vehicle flies. For example, the mean tension after the aerial vehicle makes three loops around the closed path may be determined, and further, releasing the mass from the elevation may be based on the determination that the mean tension is below the threshold value.

As shown by block 708, the method 700 includes increasing the tension in the tether responsive to the mass dropping after being released by the connector. In some instances, the tension may be increased to be above the threshold value. In other instances, the tension may be increased based on an amount of mechanical energy required for the aerial vehicle to perform an emergency maneuver. Increasing the tension in the tether may be caused by a force of the mass falling. Based on the increase in tension, the aerial vehicle may experience a force that causes an increase in an airspeed and/or an altitude of the aerial vehicle.

Depending on the amount of mechanical energy required and a weight of the mass, a braking mechanism or other device may limit a distance that the mass drops or a velocity that the mass drops. For example, dropping the mass the entire elevation results in two hundred kilowatt-hours of energy being added to the aerial vehicle, but only one hundred kilowatt-hours are required, the distance that the mass drops may be limited to one half of the elevation.

As shown by block 710, the method 700 includes transferring the mechanical energy from the mass to the aerial vehicle responsive to increasing the tension in the tether. The mass may have the gravitational potential energy when the mass is held at the elevation. When the mass is released, that gravitational potential energy may be transferred into kinetic energy that is then transferred to the aerial vehicle by increasing the tension in the tether. Increasing the tension in the tether causes a force to be applied to the aerial vehicle. As such, by releasing the mass the mechanical energy of the aerial vehicle (i.e. the sum of kinetic and potential energies of the aerial vehicle) may be increased via the tether.

The method 700 may include additional steps such as controlling a rate of descent of the mass when the mass is released. Controlling the rate of descent may include controlling an increased to a velocity or an airspeed of the aerial vehicle. In some embodiments, it may be predetermined that the aerial vehicle should be pulled at a rate of one meter per second when the mass is released. As such, the rate of descent of the mass may be controlled by a braking mechanism to be one meter per second in order to correspond to the rate that the aerial vehicle should be pulled. Pulling on the aerial vehicle at too high of a rate could cause damage to the tether or the aerial vehicle, while pulling too slowly may not provide enough velocity for the aerial vehicle to perform an emergency maneuver. Thus, the rate of descent of the mass may be controlled.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information, such as a block of a method described above, may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

IV. CONCLUSION

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

I claim:

1. A system, comprising:
an aerial vehicle;
a ground station;
a tether comprising a proximal portion coupled to the ground station and a distal portion coupled to the aerial vehicle such that the tether is under tension during flight of the aerial vehicle;
a mass that is coupled to the proximal portion of the tether, wherein the mass possesses a gravitational potential energy; and
a connector configured to releasably hold the mass at an elevation and to release the mass when the tension is below a threshold level, wherein release of the mass transfers energy to the aerial vehicle by increasing the tension in the tether.

2. The system of claim 1, further comprising:
an enclosure surrounding at least a portion of a drop path of the mass and through which the mass will travel when the mass is released.

3. The system of claim 1, further comprising:
a braking mechanism configured to control a rate of descent of the mass when the connector is released.

4. The system of claim 1, further comprising:
a control system configured to:
while the aerial vehicle is in flight, monitor the tension of the tether;
determine whether the tension is below the threshold value; and
responsive to a determination that the tension is below the threshold value, cause the connector to release the mass.

5. The system of claim 4, wherein the control system is further configured to:
responsive to the determination that the tension is below the threshold value, cause the aerial vehicle to perform an emergency maneuver.

6. The system of claim 5, wherein at least one of a weight of the mass or the elevation is based on the emergency maneuver.

7. The system of claim 1, wherein a mechanical energy of the aerial vehicle increases when the connector releases the mass and causes the mass to drop.

8. The system of claim 1, wherein an altitude of the aerial vehicle increases when the connector releases the mass and causes the mass to drop.

9. The system of claim 1, wherein an airspeed of the aerial vehicle increases when the connector releases the mass and causes the mass to drop.

10. The system of claim 1, wherein the mass comprises a solid material.

11. The system of claim 1, wherein the mass comprises a container and a liquid.

12. A method, comprising:
coupling a mass to a proximal portion of a tether, wherein an aerial vehicle is coupled to a distal portion of the tether and further wherein the mass has a gravitational potential energy;
holding the mass at an elevation by a connector configured to releasably hold the mass;
determining that a tension in the tether is below a threshold value;
releasing, by the connector, the mass from the elevation, wherein releasing the mass from the elevation is based on the determination that the tension in the tether is below a threshold level and causes the mass to drop;
responsive to the mass dropping, increasing the tension in the tether; and
responsive to increasing the tension in the tether, transferring a mechanical energy from the mass to the aerial vehicle.

13. The method of claim 12, further comprising:
based on the determination that the tension in the tether is below the threshold value, causing the aerial vehicle to perform an emergency maneuver.

14. The method of claim 13, further comprising:
based on the emergency maneuver to be performed, limiting a distance that the mass drops.

15. The method of claim 13, further comprising:
controlling, by a braking mechanism, a rate of descent of the mass when the mass is released from the elevation.

16. The method of claim 13, further comprising:
increasing an altitude of the aerial vehicle when the mass is released from the elevation.

17. An apparatus comprising:
a mass that has a gravitational potential energy, wherein the mass is coupled to a proximal portion of a tether, and further wherein an aerial vehicle is coupled to a distal portion of the tether; and
a connector releasably coupled to the mass, wherein the connector is configured to hold the mass at an elevation until a tension in the tether is below a threshold level, and when the tension is below the threshold level the mass is released by the connector causing the tension in the tether to increase and energy to be transferred to the aerial vehicle.

18. The apparatus of claim 17, further comprising:
a braking mechanism configured to control a rate of descent of the mass when the mass is released by the connector.

* * * * *